April 12, 1932. L. F. CARTER 1,853,506
DISTANT CONTROL SYSTEM
Filed Dec. 23, 1926
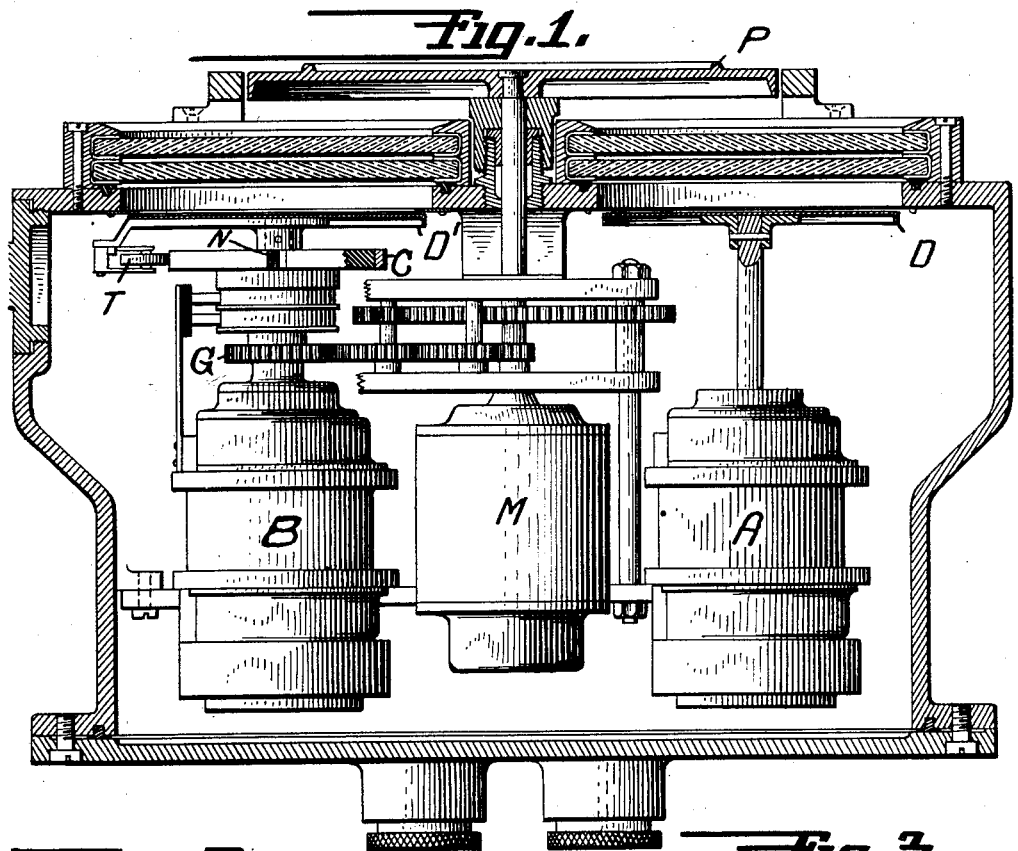
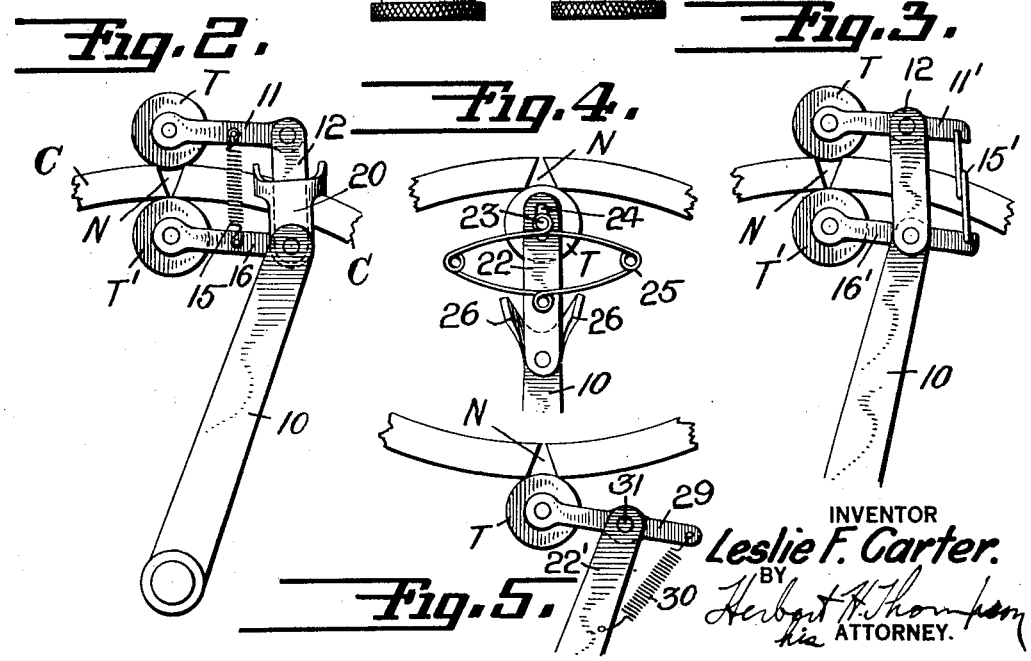
INVENTOR
Leslie F. Carter.
BY Herbert H. Thompson
his ATTORNEY.

Patented Apr. 12, 1932

1,853,506

UNITED STATES PATENT OFFICE

LESLIE F. CARTER, OF LEONIA, NEW JERSEY, ASSIGNOR, BY MESNE ASSIGNMENTS, TO SPERRY GYROSCOPE COMPANY, INC., OF BROOKLYN, NEW YORK, A CORPORATION OF NEW YORK

DISTANT CONTROL SYSTEM

Application filed December 23, 1926. Serial No. 156,749.

This invention relates to distant control systems wherein one object is controlled from a remote baseline and more particularly to those systems wherein a distantly positioned object is maintained fixed in azimuth from a gyroscopic compass. It is well known that such compass has imparted thereto a continuous hunt to eliminate static friction and it will be understood that ordinarily all movements of the compass, including the said hunt movements, are transmitted to the distant object which, therefore, partakes of the hunting oscillations of the control instrument. This, it will be understood, is highly undesirable where objects, such as line-of-sight instruments, are controlled by the compass, because it is the main objective to maintain such line-of-sight fixed in azimuth and it is practically impossible to do so when the said instrument is subject to continuous oscillation. It is the principal object of this invention, therefore, to provide in such a transmission system means for eliminating the hunting oscillations before they reach the controlled object. It has been proposed heretofore to accomplish this by causing a trolley controlled from the compass to engage an insulated segment normally wide enough so that the trolley does not leave said segment during ordinary hunting oscillations of the compass and hence no circuit is established through the repeater motor which controls the position of the remotely located object and only movements of the compass in excess of the hunt movements will cause the said motor to be energized to actuate the remotely controlled object in accordance with the movements of the compass. This, however, is undesirable because such motor must be reversible and the circuits through the opposite fields of said motor are normally deenergized so that when the trolley engages a contact segment it takes some time to build up the field and armature current of the motor and hence results in a sluggish response of the controlled object.

It is another object of my invention, therefore, to provide a hunt eliminating means wherein the said actuating motor is normally maintained energized whereby quick response of the controlled object is obtained.

It is a further object of my invention to provide a contact system for controlling an actuating motor as described above wherein two trolleys are employed for establishing the circuit thus cutting the sparking tendency in half and prolonging the life of the contacts. By the provision of two trolleys in the said contact system, a more positive positioning can be obtained than in the case of but a single trolley. This system also permits a more rapid making and breaking of the rotor circuit than is possible with a single trolley.

Still further objects and advantages of this invention will be pointed out in the following detailed description thereof:

In the accompanying drawings,

Fig. 1 is a vertical section through a repeater instrument for controlling the position of an object in accordance with the position of a remote control instrument, such as a compass.

Fig. 2 is an enlarged detail of a form of trolley contact system which may be employed in my invention.

Fig. 3 is a view similar to Fig. 2 showing a modified form of trolley system.

Fig. 4 is a view similar to Figs. 2 and 3 showing a further modified form of trolley system.

Fig. 5 is a view similar to Fig. 4, showing still another modified form of trolley system.

Referring to Fig. 1, there is shown an instrument which may be similar to that shown in the application of William R. Hight, Serial No. 144,205, filed October 26, 1926, and fully described therein so that it need only be pointed out here that A and B are coarse and fine repeater motors respectively controlled from a gyro compass (not shown) operating through coarse and fine transmitters (not shown). The said motors may actuate coarse and fine dials D—D' fixed to the armature shafts thereof. The fine repeater motor B may have fixed to the shaft thereof a trolley, such as T, engaging contact segments, such as C, so that actuation of the armature of motor B causes trolley T to engage one or the other of two contact segments C to energize one or the other of the oppositely wound fields of a motor M, which through suitable gearing actuates an instrument which may be a line-of-sight instrument, such as an alidade (not shown), mounted upon a platform P fixed to the motor shaft. The gear ratios employed are such that the movements of platform P are exactly equal to the movements of the gyro compass card. The motor M actuates a follow-up to the contact C through gearing which includes the gear G, as will readily be understood, to cause the insulated segment between contacts C to engage trolley T.

The structure described above, especially as relating to the contact segments C separated by an insulated segment, refers to the said Hight application, and in place thereof I substitute one of the forms of contact systems shown in Figs. 2 to 5 inclusive. In any of said forms there is means for eliminating the hunting oscillations which the compass transmits to the repeater motors A and B so that trolley T is, of course, subject to such oscillations in the said Hight application. In the present invention, however, I fix to the armature shaft of motor B a link 10 which will, of course, partake of the hunting or oscillating movements of the gyro compass. For eliminating the said hunt before it reaches the contact system, I provide the following arrangements. Instead of the insulated portion between contact segments C, I provide a wedge-shaped notch N in the large open end of which rests the trolley T. Said trolley may be connected to the arm 10 by means of a link 11 pivoted at one end to a link 12 which is loosely pivoted to the end of shaft 10. Ordinarily hunting movements of shaft 10 will not cause movement of trolley T if said trolley is maintained within said notch N with an appreciable force, which we shall hereinafter term the detent force. Under such conditions, trolley T would remain firmly in said notch and hunting movements of arm 10 would merely cause rocking of link 12 about the pivots connecting it to links 10 and 11. For providing the said detent pressure I may employ a spring 15 connecting the link 11 of said trolley T with the link 16 of an auxiliary trolley T', said link 16 being also loosely pivoted to the outer end of link 10. The auxiliary trolley T' has other advantages besides merely providing a fulcrum for the detent force and said functions will be set out more in detail hereinafter.

For actuating trolley T out of notch N and into engagement with one or the other of contact segments C when the compass card moves through angular distances greater than the hunting angle, I may provide a positive actuating member in the form of a U-shaped member 20 fixed to the end of link 10 and straddling link 12. The amount of lost motion between the arms of U-shaped member 20 and link 12 is equivalent to the hunting movement so that any movement of link 10 beyond the hunting movements will cause one or the other of the arms of U-shaped member 20 to engage member 12 to actuate the same and thus withdraw trolley T from groove N and into engagement with one or the other of contact segments C.

In Fig. 3 I have shown a modified form of my invention wherein I do not rely upon a positive member for moving trolley T out of the notch N when the hunting movements are exceeded but rely entirely upon adjusting the detent force with which trolley T is held in said notch, such that it will resist dislodgment therefrom until arm 10 is moved a distance in excess of the hunting angle. The detent force is such that any movements of arm 10 within the hunting angle will merely cause rocking of links 11' and 16' about the pivots which join them to link 12, but as soon as arm 10 is moved a distance in excess of the hunting angle, the detent force is no longer able to maintain trolley T in engagement with groove N and circuit is established through motor M. The spring employed for applying the detent force or pressure may be a spring such as 15' of the loop or hairpin type, the outer ends of which are engaged in links 11' and 16'.

In the forms of the invention disclosed in Figs. 2 and 3 it will be observed that two trolleys are employed on opposite sides of the contact segments and that the detent pressure is entirely between the two trolleys and does not react upon the arm 10. The said arm is, therefore, relieved of inertia or load and is left free to take up its normal or neutral position so that there results a more accurate positioning than would be possible where the detent force reacted upon the arm 10. It will also be readily appreciated that the provision of two trolleys will reduce sparking and thus prolong the life of the trolleys.

In Fig. 4 I have disclosed a modification of my invention wherein I may employ but a single trolley T carried at one end of a link 22, said link being pivoted at the other end to the actuating arm 10. The detent force may be obtained by means of a spring 25 fixed at one end to link 22 and at the other end engaging a pin 23 carried by trolley T and projecting through an elongated slot 24 in link 22. The spring 25 is, therefore, free to press upon trolley T to maintain the same in engagement with groove N. While I could employ the same system as in Fig. 3, that is to say, rely entirely upon the detent force which holds trolley T in groove N to resist dislodgment until arm 10 has been actuated beyond the hunting angle, I may also provide arm 10 with the U-shaped prongs 26, such that when the hunting angle is exceeded one or the other of prongs 26 will engage link 22 to actuate the same positively and cause dislodgment of trolley T.

Still another modification of my invention is disclosed in Fig. 5 wherein I rely once more upon the detent force to maintain trolley T in engagement with groove N until the hunting angle is exceeded. In this case the detent force may be obtained by means for a spring 30 fixed at one end to a link 22' similar to link 22 of Fig. 4, and at the other end to a link 29 pivoted intermediate its length upon arm 22' at 31 and carrying at its other end the trolley T. It will be seen from this structure that movement of the arm 10, to which link 22' is pivoted, within the hunting angle will not dislodge trolley T provided the spring tension 30 is sufficient but will merely cause rocking of link 29 about its pivot 31.

In all of the forms of the invention hereinbefore described, it will be noted that the trolley T is maintained in notch N with a certain force and that it is not until that force is exceeded that the trolley T is dislodged. This results in a trigger action such that when the dislodging force exceeds the detent force, the trolley T snaps out of the notch resulting in a very sharp making and breaking of motor circuits.

It will be understood that the invention will apply to other forms of actuating motors wherein the reversal of the motor is accomplished by other means than a pair of oppositely wound field coils, as for example, by means of a relay having opposite coils. The invention, therefore, may be said to apply broadly to the control of an actuating motor through a pair of electro-magnetic elements, both of which are normally energized so that no time is lost in building up the current in said elements.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an repeater system including a repeater motor subject to hunting oscillations transmitted thereto, an actuating motor having a pair of opposed windings, means whereby said actuating motor is controlled by said repeater motor, and means for eliminating the hunt before transmission to said actuating motor, said means including a pair of spaced contact segments in circuit with said windings, a trolley in said space and normally engaging both segments during hunting movements, and a lost-motion connection between said trolley and said repeater motor of an amount only sufficient to eliminate said hunting movement.

2. In a repeater system including a repeater motor subject to hunting oscillations transmitted thereto, an actuating motor having a pair of opposed windings, means whereby said actuating motor is controlled by said repeater motor, and means for eliminating the hunt before transmission to said actuating motor, said means including a pair of spaced contact segments in circuit with said windings, a trolley in said space and normally engaging both segments, and a connection between said trolley and said repeater motor adapted to yield to a predetermined degree of an amount only sufficient to eliminate said hunting movement.

3. In a repeater system including a repeater motor subject to hunting oscillations transmitted thereto, a reversible actuating motor, means whereby said actuating motor is controlled by said repeater motor, and means for eliminating the hunt before transmission to said actuating motor, said means including a pair of spaced contact segments in circuit with said motor, a trolley in said space and normally engaging both segments during said hunting movements, means for maintaining said trolley in said space with a predetermined force, and a lost motion connection between said repeater motor and said trolley of an amount only sufficient to eliminate said hunting movement.

4. In a repeater system including a repeater motor subject to hunting oscillations transmitted thereto, a reversible actuating motor, means whereby said actuating motor is controlled by said repeater motor, and means for eliminating the hunt before transmission to said actuating motor, said means including a pair of spaced contact segments in circuit with said motor, a trolley in said space and normally engaging both segments, a yielding connection between said trolley and said repeater motor, and means for maintaining said trolley in said space with a predetermined force of an amount only sufficient to eliminate said hunting movement.

5. In a repeater system including a repeater motor subject to hunting oscillations transmitted thereto, an actuating motor having a pair of oppositely wound fields, means whereby said actuating motor is controlled by said repeater motor, and means for eliminating the hunt before transmission to said actuating motor, said means including a pair of spaced contact segments in circuit with said fields, a trolley in said space and normally engaging both segments during said hunting movements, means for maintaining said trolley in said space with a predetermined force, and means whereby said trolley is disengaged from said space when said repeater motor is actuated beyond the hunting angle.

6. In a repeater system including a repeater motor subject to hunting oscillations transmitted thereto, an actuating motor having a pair of oppositely wound fields, means whereby said actuating motor is controlled by said repeater motor, and means for eliminating the hunt before transmission to said actuating motor, said means including a pair of spaced contact segments in circuit with said fields, a trolley adapted to engage in said space, and means whereby said trolley normally engages both segments during said hunting movements, said last-named means including means for maintaining said trolley in said space with a predetermined force, and positive means whereby said trolley is disengaged from said space when said repeater motor operates beyond the hunting angle.

7. In a repeater system including a repeater motor subject to hunting oscillations transmitted thereto, an actuating motor, means whereby said actuating motor is controlled by said repeater motor, and means for eliminating the hunt before transmission to said actuating motor, said means including a pair of spaced contact segments in circuit with said motor, a pair of trolleys in said space normally engaging both segments on two opposing sides thereof, an arm connected to said repeater motor and carrying said trolleys, and means for maintaining said trolleys in said space with a predetermined pressure only sufficient to eliminate said hunt.

8. In a repeater system including a repeater motor subject to hunting oscillations transmitted thereto, an actuating motor, means whereby said actuating motor is controlled by said repeater motor, and means for eliminating the hunt before transmission to said actuating motor, said means including a pair of spaced contact segments in circuit with said motor, a pair of trolleys in said space normally engaging both segments on two opposing sides thereof, an arm connected to said repeater motor and carrying said trolleys, and means for maintaining said trolleys in said space with a predetermined pressure, said last-named means acting to apply pressure only between said trolleys only sufficient to eliminate said hunt.

9. In a device of the class described, a primary member, a follow-up member, a reversible motor, means whereby said motor actuates said follow-up member, reversing contacts on said members for controlling the motor without hunting of the follow-up member, said contacts comprising a pair of adjacent conducting segments with a gap therebetween on one of said members, and a trolley normally resting in said gap and having a connection with the other of said members adapted to yield to a predetermined degree, said connection including means for maintaining said trolley in said gap with a predetermined pressure only sufficient to eliminate said hunt.

In testimony whereof I have affixed my signature.

LESLIE F. CARTER.